Patented Aug. 14, 1923.

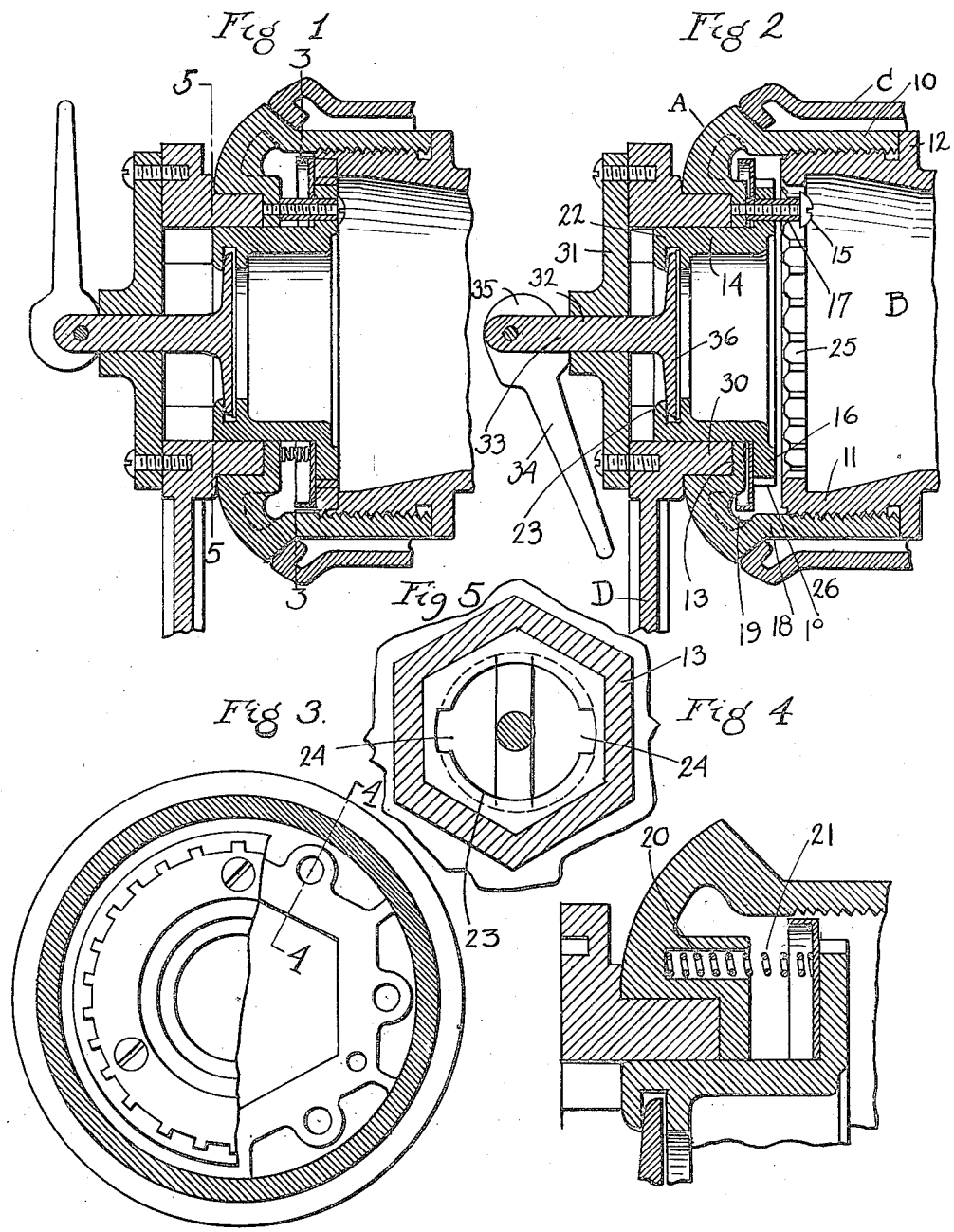

1,465,247

UNITED STATES PATENT OFFICE.

HENRY A. HOUSE, JR., OF BUFFALO, NEW YORK, ASSIGNOR TO WIRE WHEEL CORPORATION OF AMERICA, OF BUFFALO, NEW YORK, A CORPORATION OF NEW YORK.

WHEEL.

Application filed October 27, 1920. Serial No. 420,053.

*To all whom it may concern:*

Be it known that I, HENRY A. HOUSE, Jr., a citizen of the United States, and resident of Buffalo, Erie County, State of New York, have invented certain new and useful Improvements in Wheels, of which the following is a specification.

This invention relates to an improvement in wheels and particularly to a hub cap adapted for use with detachable wheels.

One object of the invention is to provide a hub cap having positively acting locking means which when in engagement will prevent any relative movement of the wheel parts.

Another object of the invention is to provide a hub cap with a reciprocally movable portion adapted in certain positions to engage the inner hub of a detachable wheel and prevent any relative movement of the hub cap thereon.

A further object of the invention is to provide a hub cap having groove in its outer face and a movable device forming the inner wall of such groove in combination with a wrench engaging the groove and adapted to positively move the device relatively to the hub cap.

Other objects of the invention will appear upon a consideration of the specification and the drawings which form a part thereof and in which:

Fig. 1 is a longitudinal section of a portion of a wheel equipped with one embodiment of this invention.

Fig. 2. is a view similar to Fig. 1 with the parts in a different relation.

Fig. 3 is a cross section taken along the line 3—3 of Fig. 1.

Fig. 4 is a longitudinal section taken along the line 4—4 Fig. 3.

Fig. 5 is a cross section taken along the line 5—5 of Fig. 1.

Referring to the drawings, A indicates the hub cap mounted upon the inner hub B of a detachable wheel and bearing against the shell C of such wheel thereby holding the shell in a fixed position relative to the hub B.

The hub cap A has an internally threaded annular flange 10 which engages the externally threaded outer end 11 of the inner hub. On the inner hub is provided an annular flange 12 to limit the engaging movement of hub cap.

The outer face of the hub cap is provided with a groove 13 non-circular in outline. As indicated in Fig. 5 the groove may have six sides or any other irregular arrangement of sides may be substituted therefor. This groove surrounds the central opening through the hub cap the outline of which, is the same as that of the groove. In this opening is mounted an axially movable device 14 which is secured to the inner side of the face of the hub cap by screws 15 passing through the annular flange 16 of the device. The screws 15 pass through collars 17 of a predetermined length, so as to fix the distance which the device can move with respect to face of hub cap.

Resting on the flange 16 is an annular plate 18 having a peripheral flange 19. The flange 19 at the edge of the plate 18 is brought very near to the inner portion of the flange 10 and thus prevents any tipping of the device 14 which might otherwise occur under certain conditions.

In the rear face of the hub cap around the groove 13 is provided a plurality of pockets 20 in which are mounted spiral springs 21. These springs bear against the plate 18 and normally tend to hold the device against the head of the screws 15 as shown by example in Fig. 1.

At the center of the outer face of the device 14 is a circular pocket 22 surrounded by an overhanging flange 23 on the outer face of the device. Openings 24 as shown for example in Fig. 5, are provided in the flange for a purpose which will be described later.

The outer end of the hub B is internally toothed at 25 and the flange 16 is externally toothed at 26. These parts are so arranged that when the hub cap is on the inner hub and the device 14, under the action of springs 21, is extended to its full length the flange 16 enters the outer end of the inner hub and the toothed portions 25 and 26 engage to prevent any relative movement of the inner hub and hub cap.

As pointed out above, the opening in the hub cap in which the device 14 is mounted is non-circular in outline so that the only relative movement between the device and the hub cap is an axial one. The device 14 acts therefore, as a locking device and will be so referred to in the remainder of the specification and the claims.

In order to operate the hub cap I have provided a wrench D having a hollow boss 30 of the same contour as the groove 13 so that when inserted in the groove the wrench will turn the hub cap. If however, the locking device is in engagement with the inner hub, as shown for example in Fig. 1, it is necessary before the hub cap can be turned to retract the locking device and for this purpose the following means are provided on the wrench.

On the wrench is bolted a plate 31 across the opening through the boss 30. In the plate 31 is provided a central opening 32 which is also central of the boss 30 and through which a retractor for the locking device operates. This retractor consists of a stem 33 which passes through the hole 32 and to which is pinned at its center end an arm 34. The portion of the arm near the stem 33 is cam shaped as at 35 so that when it occupies position shown in Fig. 2 the stem is drawn up through the hole 32. At the inner end of the stem 33 is provided a plate or bar 36 of a size suitable to enter the openings 24 in the overhanging flange 23.

On applying the wrench to the hub cap, the boss 30 is first inserted in the groove 13 and the plate 36 passed through the openings 24. The stem 33 is then turned so that the ends of the plate 36 are below the overhanging flange 23, as shown in Fig. 1. The handle 34 is then shifted so that the cam portions 35 bearing against the outer face of the bar 31 will retract the stem 33 and, through plate 36 and a flange 23, the locking device 14.

The parts then occupy the position shown in Fig. 2 and the wrench can be used to remove the hub cap from the inner hub.

As shown and described, the overhanging flange 23 around the pocket 22 has two diametrically opposite openings 24. Obviously however, the number and position of the openings can be changed. In fact by proper arrangement it can be insured that the hub caps of any set of wheels can be taken off only with the wrench particularly intended for them, the part 36 of the wrench of course being changed to correspond to the changes in position or sizes of openings 24.

While only certain embodiments have been disclosed and described I do not wish to be limited thereby since it is obvious that others could be made without departing from the spirit and scope of this invention as set forth in the following claims.

Having set forth my invention, that which I claim to be new and for which I desire the protection of Letters Patent is as follows:—

1. In a detachable wheel the combination of a hub cap having a non-circular central opening, an inner hub having an annular row of teeth at its outer end, a locking device reciprocally mounted in the opening of said hub cap and having a pocket in its outer face surrounded by an overlapping flange and a flange at its inner end provided with teeth adapted to mesh with the teeth on said inner hub means limiting the inward reciprocation of said device and spring means normally forcing the teeth on said device into mesh with the teeth on the inner hub, said overlapping flange being adapted for engagement to retract said locking device against the action of said spring means.

2. In a detachable wheel the combination of an inner hub having an annular row of teeth, a hub cap having a noncircular central opening, and a continuous groove in its outer face, and an axially movable device mounted to reciprocate into and out of engagement with the teeth on said hub, said device forming the inner wall of said groove.

3. In a detachable wheel of the type set forth in claim 2, the outer face of said axially movable device being normally flush with the outer face of said cap.

4. In a detachable wheel of the type set forth in claim 3 the hub cap having pockets in its inner face, springs seated in said pockets and bearing against said device to hold the outer face of said device normally flush with the outer face of the hub cap.

5. In a detachable wheel of the type set forth in claim 2, a radial flange at the inner end of said device, and spring means bearing against said flange to position said device with its outer face flush with the outer face of said hub cap.

6. A hub cap having an annular flange and a central opening, a device mounted to reciprocate in said opening, a radial flange at the inner end of said device, and an annular plate resting on and extending beyond said flange, and having a peripheral flange adjacent the annular flange of the hub cap.

7. A hub cap having an annular flange and a central opening, a device mounted to reciprocate in said opening, a radial flange at the inner end of said device, an annular plate resting on and extending beyond said flange, and having a peripheral flange adjacent the annular flange of the hub cap and springs bearing against said annular plate at all times to hold it normally in contact with the radial flange of the locking device.

In testimony whereof I affix my signature.

HENRY A. HOUSE, Jr.